(12) United States Patent
Ledoux

(10) Patent No.: US 11,453,043 B2
(45) Date of Patent: Sep. 27, 2022

(54) RIVETING MACHINE AND METHOD

(71) Applicant: CYBERMECA, Fontenay-le-Comte (FR)

(72) Inventor: Didier Ledoux, Fontenay-le-Comte (FR)

(73) Assignee: CYBERMECA, Fontenay-le-Comte (FR)

( * ) Notice: Subject to any disclaimer, the term of this patent is extended or adjusted under 35 U.S.C. 154(b) by 0 days.

(21) Appl. No.: 16/976,387

(22) PCT Filed: Mar. 5, 2019

(86) PCT No.: PCT/FR2019/050486
§ 371 (c)(1),
(2) Date: Aug. 27, 2020

(87) PCT Pub. No.: WO2019/170997
PCT Pub. Date: Sep. 12, 2019

(65) Prior Publication Data
US 2021/0114083 A1    Apr. 22, 2021

(30) Foreign Application Priority Data

Mar. 5, 2018  (FR) ...................................... 1800193

(51) Int. Cl.
*B21J 15/14*    (2006.01)
*B21J 15/02*    (2006.01)
(Continued)

(52) U.S. Cl.
CPC ............. *B21J 15/142* (2013.01); *B21J 15/02* (2013.01); *B21J 15/28* (2013.01); *B21J 15/42* (2013.01); *B21J 15/48* (2013.01); *B23B 35/00* (2013.01)

(58) Field of Classification Search
CPC ... B21J 15/10; B21J 15/12; B21J 15/16; B21J 15/26; B21J 15/142; B21J 15/42
See application file for complete search history.

(56) References Cited

U.S. PATENT DOCUMENTS 4,885,836 A * 12/1989 Bonomi ................... B21J 15/10
                                                              29/524.1
5,687,463 A    11/1997 Michalewski et al.
6,072,583 A *  6/2000 Kellner .................... B21J 15/10
                                                              227/119

FOREIGN PATENT DOCUMENTS

CN       106363122 A    2/2017
DE       29611124 U1    11/1996
FR       3006922 A1     12/2014

OTHER PUBLICATIONS

International Search Report and Written Opinion dated Jun. 19, 2019 in counterpart application No. PCT/FR2019/050486; with English partial translation and partial machine translation (total 23 pages).

* cited by examiner

*Primary Examiner* — Christopher J Besler
(74) *Attorney, Agent, or Firm* — Seckel IP, PLLC

(57) ABSTRACT

The invention relates to a riveting machine comprising a piercing tool (52), an upper sheet clamp (71), and a lower sheet clamp (21), mounted movable relative to each other in the direction of bringing said sheet clamps (71, 21) closer to each other, an upper riveting tool (51) and a lower riveting tool (29) for flaring a rivet disposed inside an orifice formed through the parts (8) to be riveted. The upper sheet clamp (71) has a passage opening (72) facing which the drilling tool (52) is adapted to be positioned to enable said drilling tool (52) to pierce an area of said parts (8) clamped between the upper sheet clamp (71) and the lower sheet clamp (21). The upper sheet clamp (71) and the lower sheet clamp (21)

(Continued)

are mounted movable relative to each other along a direction transverse to the piercing axis. The invention also relates to a riveting method.

20 Claims, 6 Drawing Sheets

(51) Int. Cl.
*B21J 15/28* (2006.01)
*B21J 15/42* (2006.01)
*B21J 15/48* (2006.01)
*B23B 35/00* (2006.01)

RIVETING MACHINE AND METHOD

FIELD OF THE INVENTION

The present invention relates generally to riveting. The invention relates more particularly to a machine for riveting parts, preferably metal sheets, for example, for an aircraft fuselage.

PRIOR ART

In order to rivet parts, such as metal sheets 8 illustrated in the example of FIG. 1, it is known to use a riveting machine comprising an upper sheet clamp 71 and a lower sheet clamp 21 to enable clamping the parts 8 to be riveted, so that they can be pierced, then riveted.

The machine also comprises a piercing tool 52 having a piercing axis for piercing an orifice through the parts to be riveted. A lower riveting tool is intended to cooperate with an upper riveting tool 51 to flare a rivet, disposed inside the orifice formed through the parts to be riveted.

The upper sheet clamp 71 has in particular a passage opening 72 facing which the piercing tool 52 is positioned to carry out the desired piercing through the parts.

To proceed with the piercing, it is provided that the axis A21 of the lower sheet clamp 21 is aligned with the piercing axis, that is to say, aligned with the axis of the piercing orifice which is intended to be made through the parts to be riveted, to form a counter-support in line with the piercing area on the side of the parts opposite to the side on which the piercing tool is applied.

However, for certain parts to be riveted, in particular for certain areas of parts to be riveted, it is observed that an obstacle, shown schematically by reference 100 in the example of FIG. 1, which may be formed by an element already fixed to one of these parts, may be present on this piercing axis between the parts and the lower sheet clamp 21, which prevents from bringing the lower sheet clamp 21 into a contact position supporting the parts in the axis of the desired piercing orifice.

Also, from documents U.S. Pat. No. 5,687,463, CN106363122 and FR3006922, riveting machines are known for which the portions of the machine which sandwich the parts to be riveted are arranged coaxially with the piercing axis, which poses the same problem as that presented above, in the event of an obstacle in the piercing axis, to produce an orifice intended to receive a rivet.

Further, from document DE29611124, a piercing machine is known which makes it possible to pierce a plate, but which does not make it possible to rivet several parts.

An objective of the present invention is to propose a new riveting machine that makes it possible to overcome all or part of the problems set forth above.

SUMMARY OF THE INVENTION

To this end, an object of the invention is a machine for riveting parts, preferably metal sheets, for example, for an aircraft fuselage, said machine comprising:
  a piercing tool which has a piercing axis;
  an upper support member, called upper sheet clamp, and a lower support member, called lower sheet clamp, mounted movable relative to each other in a direction of bringing said sheet clamps closer to each other, to enable clamping the parts to be riveted;
  a rivet holding and setting tool, called upper riveting tool;
  a support element, called lower riveting tool, adapted to cooperate with the upper riveting tool to flare a rivet, when said rivet is disposed inside an orifice pierced through the parts to be riveted, between said lower and upper riveting tools;
  the upper sheet clamp having a passage orifice facing which the piercing tool is adapted to be positioned to enable said piercing tool to pierce an area of said parts clamped between the upper sheet clamp and the lower sheet clamp,
  characterized in that the upper sheet clamp and the lower sheet clamp are mounted movable relative to each other along a direction transverse to the piercing axis, to be able to position the passage opening of the upper sheet clamp facing the area of the parts to be pierced, and to bring the lower sheet clamp, supporting the parts, in a position offset from the axis of the passage orifice of the upper sheet clamp.

The relative transverse mobility of the sheet clamps allows a lateral offset of the support axis of the lower sheet clamp with respect to the axis of the passage orifice formed in the upper sheet clamp, which is located facing the area of the part to be pierced.

Thus, despite the presence of an obstacle under the area to be pierced of the parts, which would prevent bringing the lower sheet clamp to face directly the area of the part to be pierced, the lower sheet clamp can be offset to bypass the obstacle and form a counter-support in the vicinity of the area to be pierced, to enable the piercing tool, which extends on the other side of the parts to be riveted, to pierce at the desired location while benefiting from a counter-support for good piercing quality.

Such a design of the machine thus makes it possible to produce all the desired orifices using the machine. The installation (positioning and flaring) of rivets in the orifices thus pierced can be carried out with the machine in the absence of an obstacle around the corresponding pierced orifice, while in the presence of an obstacle on the side of the lower sheet clamp, the operator retains the possibility of placing the rivet manually in the already-pierced orifice.

The possibility of producing all the piercing orifices (necessary for the installation of the rivets using the same riveting machine, despite the presence of an obstacle on the side of the lower sheet clamp, allows significant time saving. Indeed, it is not necessary to transfer the parts between several machines to carry out the piercing and riveting operations, even in the event of an obstacle, which makes it possible to save a significant amount of time.

It is understood that the use of several separate machines as a function of the presence of an obstacle and/or of the tools to be used, would pose space and cycling time problems.

The machine can also include one or more of the following characteristics implemented in any technically admissible combination.

According to an advantageous characteristic of the invention, the upper riveting tool is movable along a direction transverse to the piercing axis, so as to come to face the passage orifice of the upper sheet clamp, to be able, once the piercing orifice of the parts has been provided, to put in place a rivet in the piercing orifice.

According to an advantageous characteristic of the invention, the upper riveting tool and the piercing tool are carried by a support structure, called riveting tool carriage, the machine comprising a motorized movement system of the riveting tool carriage along a direction transverse to the piercing axis.

According to an advantageous characteristic of the invention, the upper sheet clamp is carried by a support structure, called head carriage, which also carries the riveting tool carriage, and the machine comprises a motorized movement system of the head carriage along a direction transverse to the piercing axis.

According to an advantageous characteristic of the invention, the motorized movement system of the head carriage comprises at least a portion of the following elements: rails, pads, ball screw, pinion, rack, reducer.

According to an advantageous characteristic of the invention, the machine comprises a support structure, called lower carriage, of the lower sheet clamp and of the lower riveting tool, and the machine comprises a motorized movement system of said lower carriage along a direction transverse to the piercing axis.

According to an advantageous characteristic of the invention, the motorized displacement system of the lower carriage comprises at least a portion of the following elements: rails, pads, ball screw, pinion, rack, reducer.

According to an advantageous characteristic of the invention, said machine comprises a chassis and a motorized movement system of the lower sheet clamp relative to the chassis, preferably along a direction parallel to the piercing axis, between a position, called inactive position of the upper sheet clamp, and a position, called clamping position, for exerting a bearing force on the parts to be riveted. In the inactive position, the sheet clamps do not exert any pressure force on the parts.

According to an advantageous characteristic of the invention, said upper riveting tool comprises a rod and two jaws located on either side of the axis of the rod, and the machine comprises a motorized displacement system of the upper riveting tool rod configured for moving said end of the rod between a first position, called high position, spaced from the support surface of the upper sheet clamp, in which said rod defines with the jaws a housing for holding a rivet, and a second position, called low position, closer to said support surface of the upper sheet clamp.

According to an advantageous characteristic of the invention, the piercing tool comprises a drilling spindle and/or a milling cutter.

The invention also relates to a method of riveting two parts using a riveting machine as described above, when an obstacle is located on the side of the lower sheet clamp in the axis of a desired piercing orifice of an area of the parts to be riveted, said method comprising the following steps:

clamping the parts between the upper sheet clamp and the lower sheet clamp, by positioning the passage opening of the upper sheet clamp facing the area of the parts to be pierced (in particular, the upper sheet clamp bears against the parts), and by bringing the to lower sheet clamp in support of the parts in a position offset from the axis of the passage orifice of the upper sheet clamp;

piercing the parts using the piercing tool positioned in the axis of the passage orifice of the upper sheet clamp to obtain the desired piercing orifice in said area of the parts to be riveted.

It is understood that the lower sheet clamp is moved away from the piercing axis sufficiently to bypass the obstacle which is located in the axis of the desired piercing orifice. According to a particular embodiment, the lower sheet clamp can be moved away from the axis sufficiently to be outside the trajectory of the piercing tool, so as not to be itself pierced.

According to an advantageous characteristic of the invention, the method comprises the following steps:

introducing (for example, by the operator) a rivet in said provided piercing orifice;

flaring the rivet using a tool, for example, an impact pistol manipulated by the operator.

In particular, it can be provided that the machine is configured to execute a program for piercing parts in multiple positions, comprising piercing positions that can be reached by the lower sheet clamp, so that the lower sheet clamp is then brought into the piercing axis, and further comprising positions that cannot be reached by the lower sheet clamp due to one or more obstacles, so that the lower sheet clamp is then moved away from the obstacle or obstacles, and therefore from the piercing axis, while ensuring a counter-support during piercing for good piercing quality. The positions of the parts pierced in areas without obstacles can be riveted by this same machine, while the positions pierced in areas subjected to one or more obstacles can be provided with rivets by this same machine, which rivets can be flared later.

BRIEF DESCRIPTION OF THE DRAWINGS

Other characteristics and advantages of the invention will emerge from the following description, which is purely illustrative and not limiting, and which must be read with reference to the appended drawings, in which.

DETAILED DESCRIPTION

Figure 1:
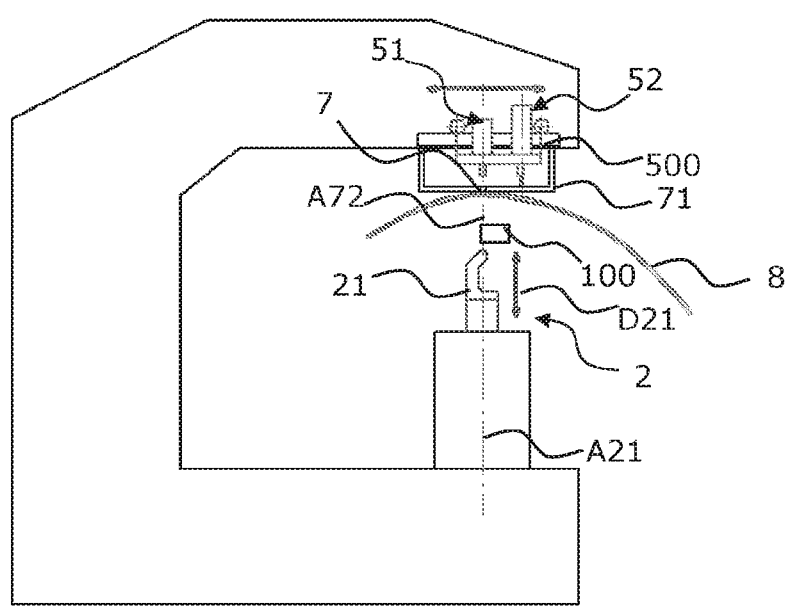
FIG. 1 is a view of a riveting machine known from the state of the art and presented above.

The concept of the invention is described more fully below with reference to the accompanying drawings, in which embodiments of the concept of the invention are shown. In the drawings, the sizes and the relative sizes of the elements may be exaggerated for the sake of clarity. Similar numbers refer to similar elements in all of the drawings. However, this concept of the invention can be implemented in many different forms and should not be interpreted as being limited to the embodiments set forth here. Instead, these embodiments are offered so that this description is complete, and they communicate the scope of the concept of the invention to those skilled in the art. The embodiments below are examined, for the sake of simplification, in relation to the terminology and structure of a riveting machine.

A reference throughout the specification to "an embodiment" means that a particular functionality, structure, or characteristic described in connection with an embodiment is included in at least one embodiment of the present invention. Thus, the presence of the phrase "in one embodiment" at various locations throughout the specification does not necessarily refer to the same embodiment. In addition, the particular features, structures, or characteristics can be combined in any suitable manner in one or more embodiments.

Figure 2:
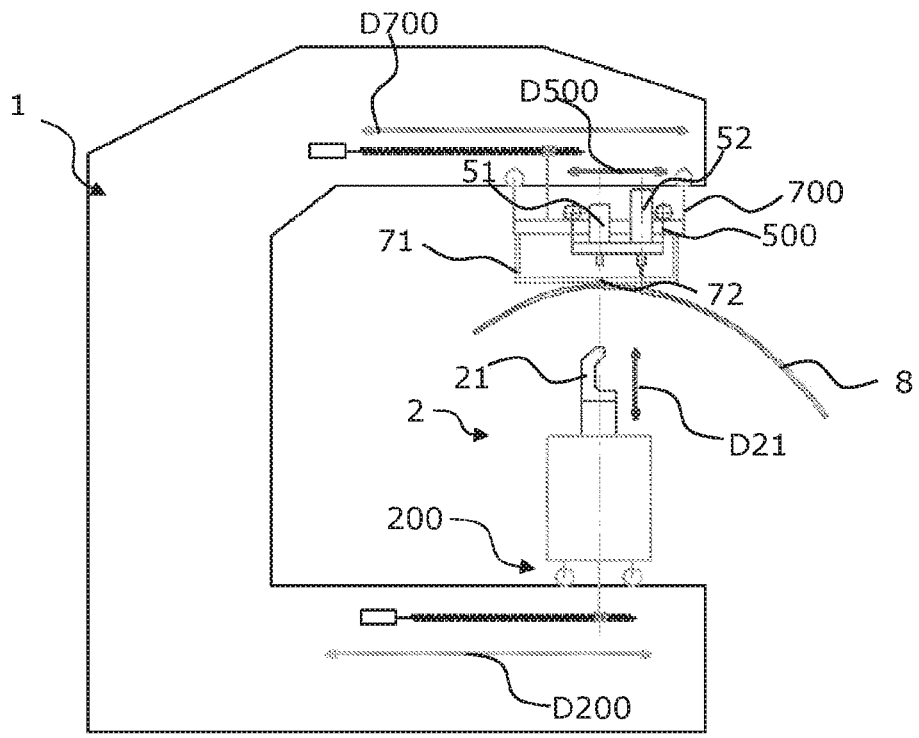
FIG. 2 is a view in accordance with one embodiment of the invention, of a riveting machine in a configuration in which the support axis of the lower sheet clamp is aligned with the axis of the passage orifice formed in the upper sheet clamp.
Figure 3:
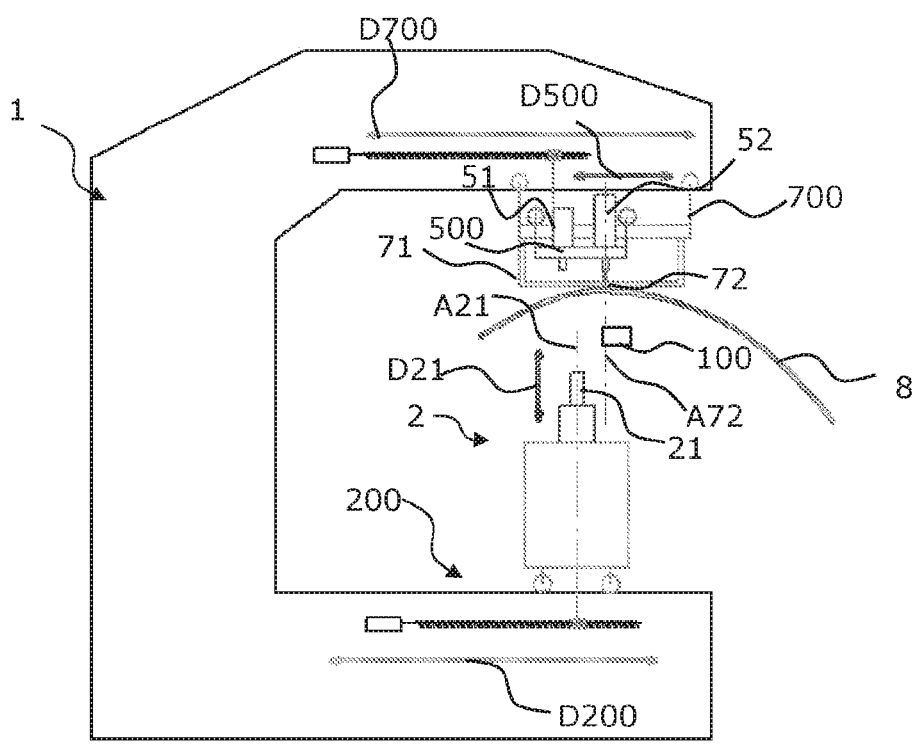
FIG. 3 is a view in accordance with one embodiment of the invention, of a riveting machine in a configuration in which the support axis of the lower sheet clamp is offset from the axis of the passage opening formed in the upper sheet clamp.

FIGS. 2 and 3 illustrate embodiments of a riveting machine for riveting parts.

The machine comprises a generally C-shaped chassis which comprises a lower part, usually called lower console, and an upper part, usually called riveting head, between which the parts to be assembled are positioned. In the example illustrated in the figures, the rivet has a body provided with a head. The parts to be riveted can be, for example, metal sheets 8 for an aircraft fuselage.

Said machine comprises a piercing tool 52 which has a piercing axis A52. The piercing tool 52 is displaceable along a direction transverse to the piercing axis A52 so as to be brought in line with an area of the parts to be pierced. The piercing tool can comprise a drilling spindle (drill) and/or a milling cutter. Indeed, it can be provided that the piercing is carried out using a milling cutter, by moving the milling cutter along the piercing axis. The milling cutter can be moved transversely to the piercing axis to machine the piercing orifice, in particular to form the outline of the orifice. In particular, it can be provided that the milling cutter is moved, for example, using a carriage, such as the riveting tool carriage presented below, along an axis Y transverse to the axis of descent of the milling cutter (for example, noted Z), while the parts to be riveted are moved together along an axis X transverse to the axis Y and to the axis of descent of the milling cutter.

The machine also comprises an upper support member, called upper sheet clamp 71, and a lower support member, called lower sheet clamp 21. The upper sheet clamp 71 comprises a support surface 70 for clamping the parts 8 to be riveted against each other, in cooperation with a corresponding support surface of the lower sheet clamp.

According to a particular aspect, the shape of the lower sheet clamp 21 can be of the straight type as illustrated in FIG. 2, or of the offset type (for example, in the form of a swan neck) as shown in FIG. 3.

The sheet clamps 71, 21 are mounted movable relative to each other in the direction of bringing said sheet clamps 71, 21 closer together, to enable clamping the parts 8 to be riveted. The sheet clamps 71, 21 are displaceable up and down along a direction A21. Direction A21 is vertical when the support surface of the machine on the ground is horizontal.

It should be noted that an offset between the axis of the lower clamp and the axis of the upper clamp (which also corresponds to the piercing axis when the piercing tool is brought to face the passage orifice 72 formed in the upper sheet clamp) is particularly advantageous, when the presence of an obstacle does not allow piercing the parts in the desired area while having the lower sheet clamp in support coaxially with the piercing axis.

It should be noted that when no obstacle prevents piercing along the axis of the lower sheet clamp, the lower sheet clamp can be positioned in the piercing axis, then the sheet clamps can be positioned to flare a rivet 10 disposed between the upper and lower riveting tools and in an orifice formed through the parts to be riveted.

The machine also comprises a rivet holding and setting tool, called upper riveting tool 51.

Figure 7:
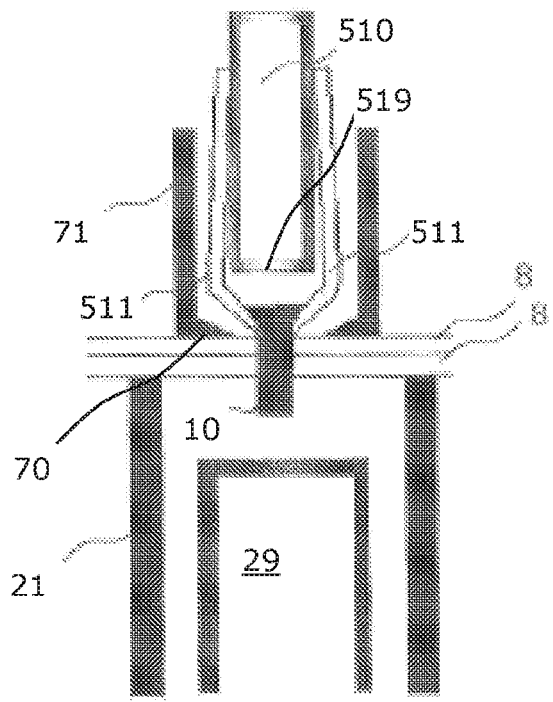
Figure 8:
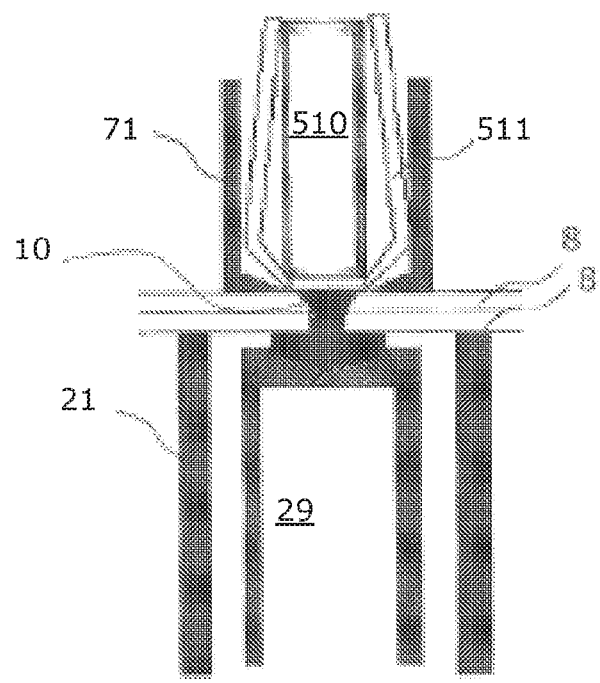

As illustrated more particularly in FIGS. 7 and 8, said upper riveting tool 51 comprises a rod 510 and two jaws 511 located on either side of the axis of the rod. The jaws are returned to the closed position. The upper riveting tool enables holding the rivet and putting it in place in an orifice formed by piercing through the parts to be assembled. Said rod has a free end 519 adapted to come to bear on a rivet 10 held between the two jaws 511. Said rod 510 is displaceable in translation along a direction parallel to its axis.

A support element, called the lower riveting tool 29, is adapted to cooperate with the upper riveting tool 51 to flare the rivet 10 (FIG. 8). The lower riveting tool 29 can be arranged inside the lower sheet clamp 21.

The upper sheet clamp 71 has a passage orifice 72 facing which the piercing tool 52 is adapted to be positioned. A drilling spindle 520 of the piercing tool 52 can thus be lowered through said passage orifice 72, to pierce an area of said parts 8 clamped between the upper sheet clamp 71 and the lower sheet clamp 21. It can be provided that the piercing tool comprises two spindles, preferably of different types, for example, to perform trimming with the second spindle after having drilled with the first spindle. Said spindles are movable up and down.

The upper sheet clamp 71 and the lower sheet clamp 21 are mounted movable relative to each other along a direction transverse to the piercing axis A52.

It can be provided that the upper sheet clamp 71 and the lower sheet clamp 21 are each movable relative to the frame of the machine, or that only one of the sheet clamps is movable relative to the frame of the machine.

According to a particular aspect, the lower sheet clamp and the upper sheet clamp are each movable relative to one another relative to the terrestrial frame of reference. The lower sheet clamp and the upper sheet clamp can thus be moved independently of each other, which allows great freedom in positioning the sheet clamps to be able to carry out the desired piercing and riveting operations, and thus, to adapt to the complexity of the parts to be riveted and/or to the presence of an obstacle in the environment of the parts to be riveted.

The lower sheet clamp and the upper sheet clamp can be moved transversely to the piercing axis, in a non-coaxial manner relative to each other, to enable the lower sheet clamp to be moved away from the piercing axis when an obstacle is located on the side of the lower sheet clamp in the area of this piercing axis.

Such transverse mobility allows a lateral offset of the support axis A21 of the lower sheet clamp relative to the axis A72 of the passage orifice 72 which is located facing the area of the parts to be pierced. Thus, despite the presence of an obstacle 100 under the area to be pierced which prevents bringing the lower sheet clamp directly facing the area to be pierced, the lower sheet clamp 21 can be offset to bypass the obstacle and form a counter-support in the vicinity of the area to be pierced to enable the piercing tool 52, which extends on the other side of the parts 8, to pierce at the desired location while benefiting from a counter-support for good piercing quality.

The upper riveting tool 51 and the piercing tool 52 are carried by a support structure, called riveting tool carriage 500. The riveting tool carriage 500 is movable along a direction D500 transverse to the piercing axis A52, and therefore also to the riveting axis A21.

Thus, the upper riveting tool 51 is movable along a direction transverse to the piercing axis A52, in order to be able to place a rivet 10 in the piercing orifice 82, once the piercing orifice 82 of the parts 8 has been provided. The movement of the riveting tool carriage 500 is performed, for example, using one or more linear (synchronized) motors.

In addition, the upper sheet clamp 71 is carried by a support structure 700, called head carriage 700, which also carries the riveting tool carriage 500. The riveting tool carriage 500 is mounted movable on the head carriage 700 along said direction transverse to the riveting axis A21.

The machine comprises a motorized movement system of the head carriage 700 along a direction D700 transverse to the piercing axis A52 (and therefore also to the riveting axis A21).

The motorized movement system of said head carriage 700 comprises, for example, all or part of the following elements: rails, pads, ball screw, pinion, rack, reducer.

According to a particular aspect, the machine comprises a system for displacing the lower sheet clamp 21 relative to the chassis of the machine, along a direction D21 parallel to the piercing axis A52, between a position, called inactive position of the upper sheet clamp 71, and a position, called clamping position, for exerting a bearing force on the parts to be riveted. Such a carriage design makes it possible to limit the size of the machine and to limit the cycling times.

The machine comprises in particular a lower carriage 200 which carries the lower sheet clamp 21 and the lower riveting tool 29. Said lower carriage is movable along a direction D200 transverse to the piercing axis A52 by using a motorized displacement system.

The displacement system of said lower carriage 200 comprises, for example, all or part of the following elements: rails, pads, ball screw, pinion, rack, reducer.

The machine also comprises a system for displacing the rod 510 of the upper riveting tool 51 configured to move said end 500 of the rod 20 between a first high position, spaced from the support surface of the upper sheet clamp 71, in which said rod 510 delimits a housing for holding a rivet (FIG. 7) between the rod and the jaws 511, and a second position, called low position, closer to said support surface of the upper sheet clamp 71 (FIG. 8).

The displacement system 510 of the rod comprises, for example, a motor, preferably electric, for good precision and high speed of movement. The motor can be associated with a system of the nut-screw type, for example, with satellite rollers. According to a particular aspect, the displacement system comprises a movement transmission mechanism between the motor and the nut, such as a belt, to enable, by turning the motor in one direction or the other, to move the screw relative to the nut along its axis in order to move the rod between its high position and its low position.

The machine can in particular comprise a linear guide element that enables guiding the vertical movement of the rod of the upper riveting tool when the screw is lowered.

The machine also comprises a control unit, also called processing and calculation unit, configured to control the actuators of the machine, in particular the mobility of the sheet clamps and riveting tools. Said control unit comprises a memory in which data can be stored, such as the desired lateral offset between the piercing axis and the axis of the lower sheet clamp in the case of piercing with offset support. Said machine can in particular comprise a data entry interface allowing an operator to define said data. Said unit also comprises a processor (for example, a microprocessor or microcontroller) that enables executing computer instructions of a program stored in a memory, preferably a nonvolatile memory.

The functions performed by the machine, in particular the relative positioning of the lower and upper sheet clamps, of the carriages, and the actuation of the various organs or tools of the machine, can thus be carried out by sets of instructions or computer modules implemented in a processor or controller. It can also be provided that all or part of these functions are performed by dedicated electronic components or components of the FPGA or ASIC type. It is also possible to combine computer portions and electronic portions.

By way of example, in the absence of an obstacle in the piercing axis, the assembly of two sheets 8 or panels can be carried out as follows.

Figure 4:
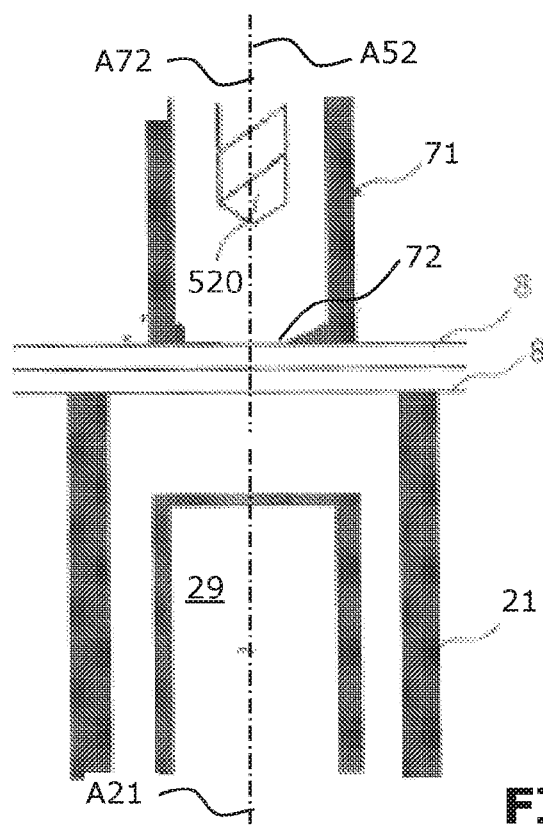
FIGS. 4 to 8 schematically illustrate different steps (piercing, sealing, rivet positioning, rivet flaring) of a process of riveting two parts, using a riveting machine, for example, in accordance with that of FIG. 2 or 3, in a configuration according to which the axis of the lower sheet clamp remains aligned with the axis of the passage orifice formed in the upper sheet clamp.
Figure 5:
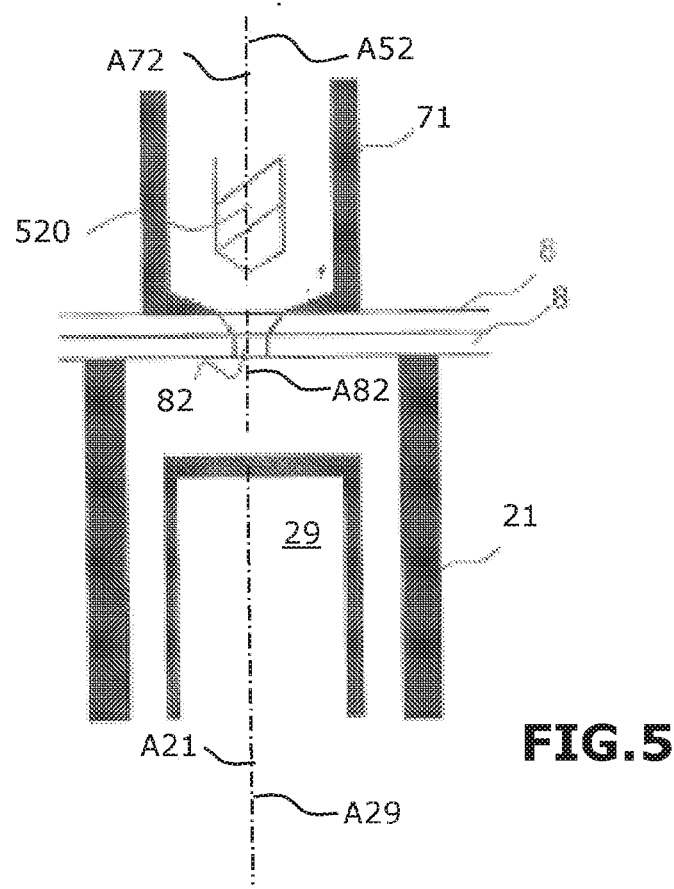
Figure 6:
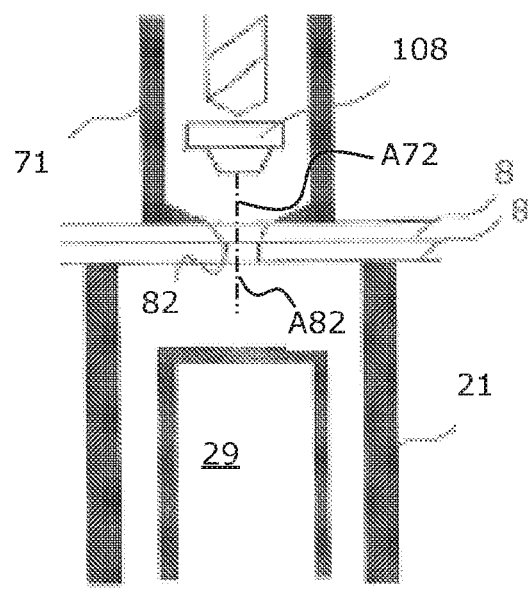

As illustrated in FIG. 4, the sheets 8 are brought into position against one another, and are clamped using the lower and upper sheet clamps. A piercing operation is carried out using one or more spindle(s) 520 carried by the carriage to provide an orifice for inserting a rivet 10. During piercing, the rivet 10 is loaded between the jaws 511 of the upper riveting tool, in hidden time. Milling of the orifice 82 is carried out, preferably at the same time as the piercing operation (FIG. 5). As illustrated in FIG. 6, insulation 108, preferably of the sealant type, is deposited in the piercing orifice using an actuator.

The rivet 10 is deposited in the piercing orifice 82, through the insulation, by lowering the rod 510 of the upper riveting tool 51 (FIG. 8). The rivet is then flared by displacement of the lower riveting tool 29 in the direction of the upper riveting tool 51 (FIG. 8). The rod 510 of the upper riveting tool 51 participates in the flaring of the rivet 10 by forming a counter-abutment stop in the manner of an anvil when the rivet 10 is flared by displacement of the lower riveting tool 29 which forms a hammer.

Figure 9:
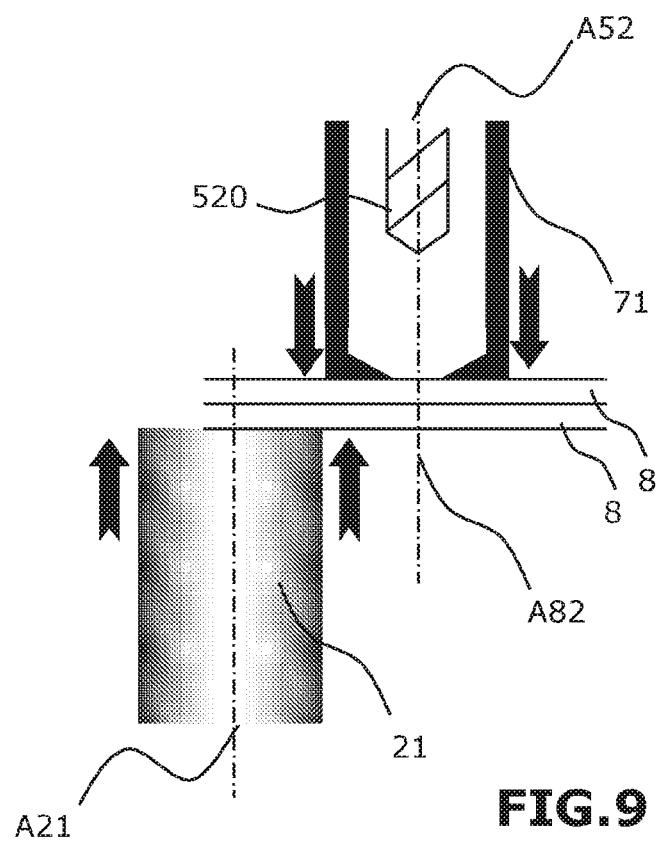
FIGS. 9 and 10 schematically illustrate steps of clamping and piercing two parts, in the offset state of the support axis of the lower sheet clamp relative to the axis of the passage orifice formed in the upper sheet clamp.
Figure 10:
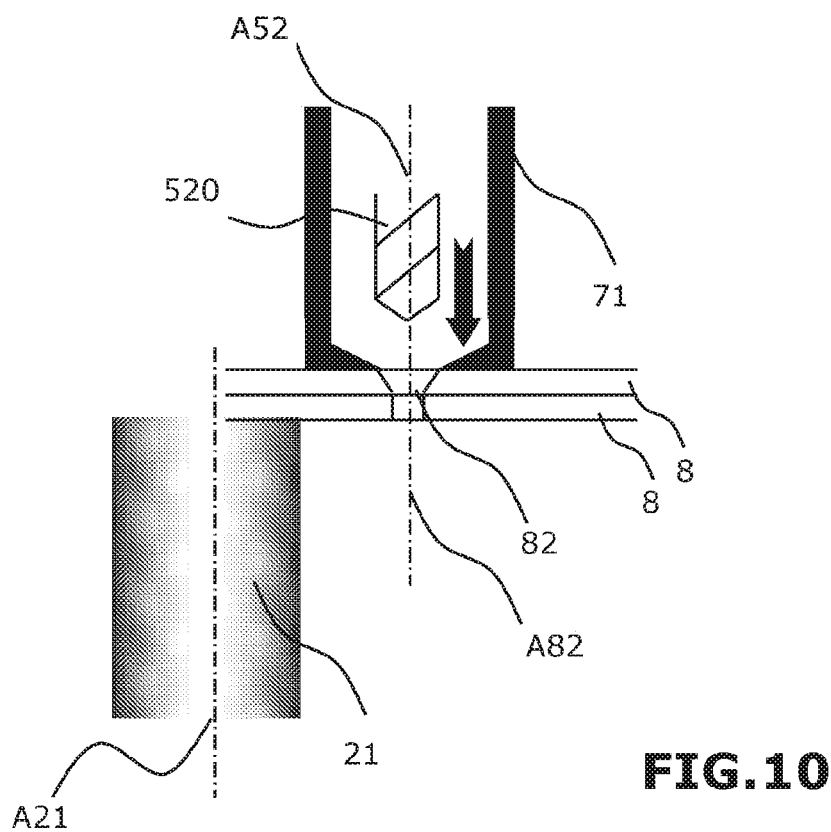

For example, in the presence of an obstacle 100 in the desired piercing axis, that is to say, in the axis of the orifice 72 formed in the upper sheet clamp, the assembly of two sheets 8 or panels can be carried out in the following manner. FIGS. 9 and 10 illustrate piercing steps, comparable to the steps illustrated in FIGS. 4 and 5, but in the case where an obstacle 100 is located in the desired piercing (and therefore riveting) axis.

In particular, as illustrated in FIG. 3, the obstacle 100 is located on the side of the lower sheet clamp 21 in the axis of a desired piercing orifice for an area of the parts to be riveted.

The parts 8 are clamped between the upper sheet clamp 71 and the lower sheet clamp 21. The passage orifice 72 of the upper sheet clamp 71 is located facing the area to be pierced of the parts 8.

The upper sheet clamp 71 is bearing against the parts 8. The lower sheet clamp 21 is bearing against the parts 8 in a position offset from the axis A72 of the passage orifice 72 of the upper sheet clamp 71, that is to say, offset from the axis A82 of the orifice 82 to be pierced (FIGS. 9 and 10), to bypass the obstacle 100 (FIG. 3).

As illustrated in FIG. 10, the parts 8 can then be pierced using a spindle 520 of the piercing tool 52 positioned in the axis of the passage orifice 72 of the upper sheet clamp 71 to obtain the desired piercing orifice 82 in said area of the parts to be riveted.

An operator can then, after removing the lower and upper sheet clamps relative to the parts 8, proceed with the introduction of a rivet in the orifice 82, for example, manually. The rivet can then be flared using an impact pistol with a counter-force.

The invention is not limited to the embodiments illustrated in the drawings.

In addition, the term "comprising" does not exclude other elements or steps. In addition, features or steps which have been described with reference to one of the embodiments set forth above can also be used in combination with other features or steps of other embodiments set forth above.

The invention claimed is:

1. Machine for riveting parts comprising:
   a piercing tool which has a piercing axis;
   an upper support member, called upper sheet clamp, and a lower support member, called lower sheet clamp, mounted movable relative to each other in a direction of bringing the sheet clamps closer to each other, to enable clamping the parts to be riveted;
   a rivet holding and setting tool, called upper riveting tool;
   a support element, called lower riveting tool, adapted to cooperate with the upper riveting tool to flare a rivet, when the rivet is disposed inside an orifice pierced through the parts to be riveted, between the lower and upper riveting tools;
   the upper sheet clamp having a passage orifice facing which the piercing tool is adapted to be positioned in a piercing position enabling the piercing tool to pierce an area of the parts clamped between the upper sheet clamp and the lower sheet clamp,
   wherein the upper sheet clamp and the lower sheet clamp are mounted movable relative to each other along a direction transverse to the piercing axis, wherein the upper sheet clamp and the lower sheet clamp are programmed to position the passage orifice of the upper sheet clamp facing the area to be pierced of the parts in the piercing position of the upper sheet clamp, and to bring the lower sheet clamp, supporting the parts, in a position offset from an axis of the passage orifice of the upper sheet clamp in the piercing position of the upper sheet clamp.

2. The machine according to claim 1, wherein the upper riveting tool is movable along the direction transverse to the piercing axis, so as to come to face the passage orifice of the upper sheet clamp, to be able, once the piercing orifice of the parts has been provided, to put in place a rivet in the piercing orifice.

3. The machine according to claim 1, wherein the upper riveting tool and the piercing tool are carried by a support structure, called riveting tool carriage, the machine comprising a motorized displacement system of the riveting tool carriage along the direction transverse to the piercing axis.

4. The machine according to claim 3, wherein the upper sheet clamp is carried by a support structure, called head carriage, which also carries the riveting tool carriage,
   and wherein the machine comprises a motorized displacement system of the head carriage along a direction transverse to the piercing axis.

5. The machine according to claim 1, wherein the machine comprises a support structure, called lower carriage, of the lower sheet clamp and of the lower riveting tool, and a motorized displacement system of the lower carriage along a direction transverse to the piercing axis.

6. The machine according to claim 1, comprising a chassis and a motorized movement system of the lower sheet clamp relative to the chassis between a position, called inactive position of the upper clamp, and a position, called clamping position, for exerting a bearing force on the parts to be riveted.

7. The machine according to claim 1, wherein the piercing tool comprises at least one selected from the group consisting of a drilling spindle and a milling cutter.

8. The machine according to claim 1, wherein the upper riveting tool comprises a rod and two jaws located on either side of an axis of the rod, and in that the machine comprises a motorized displacement system of the rod of the upper riveting tool configured to move the end of the rod between a first position, called high position, spaced from the support surface of the upper sheet clamp, in which the rod delimits with the jaws a housing for holding a rivet, and a second position, called low position, closer to the support surface of the upper sheet clamp.

9. A method of piercing two parts to be riveted, when an obstacle is located on a side of a lower sheet clamp in an axis of a desired piercing orifice of an area of the parts to be riveted, the method comprising:
   providing the machine for riveting parts according to claim 1;
   clamping the parts between the upper sheet clamp and the lower sheet clamp, by positioning the passage orifice of the upper sheet clamp facing the area to be pierced of the parts, and by bringing the lower sheet clamp in support of the parts in a position offset from the axis of the passage orifice of the upper sheet clamp;
   piercing the parts using the piercing tool positioned in the axis of the passage orifice of the upper sheet clamp to obtain the desired piercing orifice in the area of the parts to be riveted.

10. A method of riveting two parts, the method comprising:
    performing the method of piercing two parts according to claim 9;
    introducing a rivet in the piercing orifice;
    flaring the rivet using a tool.

11. The method according to claim 9, wherein the parts are metal sheets.

12. The method according to claim 10, wherein the tool is an impact pistol.

13. The machine according to claim 1, wherein the machine is adapted to the riveting of parts which are metal sheets.

14. The machine according to claim 6, wherein the motorized movement system of the lower sheet clamp is adapted to move the lower sheet clamp relative to the chassis along a direction parallel to the piercing axis between the inactive position and the clamping position.

15. The machine according to claim 2, wherein the upper riveting tool and the piercing tool are carried by a support structure, called riveting tool carriage, the machine comprising a motorized displacement system of the riveting tool carriage along a direction transverse to the piercing axis.

16. The machine according to claim 15, wherein the upper sheet clamp is carried by a support structure, called head carriage, which also carries the riveting tool carriage,
    and wherein the machine comprises a motorized displacement system of the head carriage along a direction transverse to the piercing axis.

17. The machine according to claim 2, wherein the machine comprises a support structure, called lower carriage, of the lower sheet clamp and of the lower riveting tool, and a motorized displacement system of the lower carriage along the direction transverse to the piercing axis.

18. The machine according to claim 3, wherein the machine comprises a support structure, called lower carriage, of the lower sheet clamp and of the lower riveting tool, and a motorized displacement system of the lower carriage along a direction transverse to the piercing axis.

19. The machine according to claim 4, wherein the machine comprises a support structure, called lower carriage, of the lower sheet clamp and of the lower riveting tool, and a motorized displacement system of the lower carriage along a direction transverse to the piercing axis.

20. The machine according to claim 2, comprising a chassis and a motorized movement system of the lower sheet clamp relative to the chassis between a position, called inactive position of the upper clamp, and a position, called clamping position, for exerting a bearing force on the parts to be riveted.

\* \* \* \* \*